United States Patent
Kelley

(10) Patent No.: US 8,186,230 B1
(45) Date of Patent: May 29, 2012

(54) SYSTEM AND METHOD FOR AIRFLOW SENSING AND MONITORING

(76) Inventor: Roy Kelley, Miami, FL (US)

( * ) Notice: Subject to any disclaimer, the term of this patent is extended or adjusted under 35 U.S.C. 154(b) by 77 days.

(21) Appl. No.: 12/849,388

(22) Filed: Aug. 3, 2010

Related U.S. Application Data

(60) Provisional application No. 61/230,916, filed on Aug. 3, 2009, provisional application No. 61/354,807, filed on Jun. 15, 2010.

(51) Int. Cl.
*G01F 1/34* (2006.01)
(52) U.S. Cl. .................................................. 73/861.42
(58) Field of Classification Search ............... 73/861.65, 73/861.42, 861.68, 861.67
See application file for complete search history.

(56) References Cited

U.S. PATENT DOCUMENTS 6,439,061 B1 * 8/2002 Nelson et al. .............. 73/861.65

OTHER PUBLICATIONS

The Energy Conservatory, TrueFlow Air Handler Flow Meter, Advertisement/Specification Sheet, 2008, 2 pages.

\* cited by examiner

*Primary Examiner* — Jewel V Thompson
(74) *Attorney, Agent, or Firm* — Lott & Fischer, PL

(57) ABSTRACT

A system and method for measuring the airflow in an air handling unit, comprising a pressure plate with a plurality of apertures having a known surface area, a differential pressure manometer, and two. The first end of the leads is attached to a differential pressure manometer and second end of the leads is attached to the pressure plate. The pressure plate is placed in the filter rack of an air conditioning system the differential pressure manometer measures the differential pressure loss across the pressure plate allowing the user to determine airflow conditions and the location of obstructions. Additional embodiments of the system and method herein include placing two sensor tubes having apertures along the thereof at specific locations within the air handling unit that, when attached to a manometer, measure the differential pressure loss across the two locations. Various methods for establishing and monitoring proper airflow in an air handling unit are also contemplated.

21 Claims, 6 Drawing Sheets

AIRFLOW IN CUBIC FEET PER MINUTE (CFM) VS.
DIFFERENTIAL STATIC PRESSURE

FOR

ACME AIR HANDLING UNIT MODEL AHU 9999

| CUBIC FEET PER MINUTE (CFM) | STATIC PRESSURE DIFFERENTIAL INCHES W.C. |
|---|---|
| 1000 | 0.40 |
| 900 | 0.35 |
| 800 | 0.30 |
| 700 | 0.25 |
| 600 | 0.20 |
| 500 | 0.15 |
| 400 | 0.10 |

Fig. 3

AIRFLOW/FILTER DEGRADATON CURVES

FOR VARIOUS FILTER TYPE/FILTER FACE VELOCITY COMBINATIONS

| FILTER TYPE/ MODEL | THICK | COST | MERV | FILTER FACE VELOCITY (fpm) | | | | | | | | | | | |
|---|---|---|---|---|---|---|---|---|---|---|---|---|---|---|---|
| | | | | 50 | 100 | 150 | 200 | 250 | 300 | 350 | 400 | 450 | 500 | 550 | 600 |
| 1. ACME 9900 | 1" | $20.00 | 12 | A | A | A | B | C | D | E | F | G | H | H | J |
| 2. ACME 9950 | 1" | $12.00 | 10 | A | B | B | B | C | C | D | D | E | E | F | G |
| 3. ACME 9800 | 1" | $8.00 | 8 | A | B | C | C | D | D | D | E | E | E | F | G |
| 4. ACME Pleated | 1" | $4.00 | 4 | A | C | D | D | E | E | E | F | F | F | F | G |
| 5. Fiberglass | 1" | $1.00 | 2 | A | A | A | A | A | A | B | B | B | C | C | C |
| 6. Spun Glass | 1" | $1.00 | 1 | A | A | A | A | A | B | B | B | C | C | C | D |

Fig. 5

SYSTEM AND METHOD FOR AIRFLOW SENSING AND MONITORING

PRIORITY INFORMATION

This application claims the benefit of U.S. Provisional Application No. 61/230,916, filed Aug. 3, 2009, and U.S. Provisional Application No. 61/354,807, filed Jun. 15, 2010.

TECHNICAL FIELD

The present invention relates generally to heating, ventilating and air condition ("HVAC") systems and more specifically to systems and methods for sensing, measuring, and monitoring airflow conditions within HVAC systems.

BACKGROUND OF THE INVENTION

Proper airflow is a critical component to assure maximum efficiency in forced-air ducted air conditioning (AC) systems. The Department of Energy sponsored Energy Star Survey determined that more than 50% of air-conditioning installations have low airflow. Low airflow reduces system efficiency (SEER), increases energy costs, results excessive maintenance and repair costs, and leads to premature failure of equipment.

Current methodology to measure and establish proper airflow is problematic and unreliable. Methods known in the art, such as placing an air velocity meter inside an AC duct and then estimating the cross-sectional area of the duct, are far too complex and prone to inaccuracy for field technician charged with effectively diagnosing problems with AC systems. More accurate and precise methods of measuring and establishing proper airflow typically require extensive technician training, and expensive instrumentation and installation costs.

One example of a known method of measuring airflow in HVAC systems includes the use of "flow hoods." A flow hood typically consists of a large housing having a known area and an air velocity sensor placed therein. The hood is then placed over an intake grill or return grill of a given ducted AC system, and the air velocity is measured. The clear downside to these flow hoods is that the large housing often renders the flow hood useless in buildings where the grills are too close to other structural elements and therefore the flow hood, while accurate, simply cannot be used.

Other examples of known methods for measuring HVAC airflow include temperature-based methods. Typically, one first turns on the heating element within the system and then measures the temperature of the air going into the heater and the temperature of the air leaving the heater. Then, a series of calculations are carried out, resulting in a determination of the airflow velocity. However, this indirect method of calculating airflow velocity can be very imprecise and inaccurate due to the stratification of the temperature gradient across the system and therefore is not effective in diagnosing problems within the HVAC system, whether up-stream or down-stream from the air handling unit.

Known means for monitoring the performance and efficiency of an HVAC system have severe limitations. Typical thermostats known in the art do not monitor the actual airflow conditions in its attendant HVAC system. Rather, they simply measure the temperature of the room to be cooled/heated and provide a feedback-based switching system for the HVAC system. While some of these thermostats have the ability to inform the user whether a filter change is needed, this indication is usually based solely on the length of operation of the HVAC system between filter changes and does not take into account the actual airflow conditions within the system.

Consequently, there is a marked need in the art for an easy-to-operate, cost-effective, integrated system and method for sensing, measuring, and monitoring the airflow conditions within an HVAC system.

SUMMARY OF THE INVENTION

The present invention comprises several embodiments of a system and method for sensing, measuring, and monitoring the airflow in an HVAC system, and more specifically, the air handling unit thereof. One embodiment comprises the use of a pressure plate having a known free area which is placed in the filter rack of an air handling unit. The pressure loss across the plate is measured using a manometer attached to the plate by two leads, one on each side. The pressure loss is converted to an airflow velocity measurement using known airflow data for the particular air handling unit. Other embodiments comprise the use of sensor tubes placed at specific locations within the air handling unit that are attached to a manometer for determining the pressure differential across the two locations.

A comparison of the measured airflow velocity to the optimal airflow velocity can be determined in order to assess whether there is an obstruction in the system. Further, the disclosed systems can be used to monitor the actual performance of a given HVAC system over time and a visible or audible indicator can be employed to signal that a filter change is needed or that there is an obstruction or other problem within the system, such as a dirty evaporator coil.

Accordingly, it is an object of the present invention to eliminate the hurdles of known methods for measuring and monitoring HVAC airflow conditions and allow an HVAC technician of average skill to accurately and precisely determine the airflow conditions and correct airflow deficiencies for any HVAC system. It is a further objective of the present invention to provide the ability to monitor an HVAC system during its useful life to assure maximum energy efficiency and filtration effectiveness.

BRIEF DESCRIPTION OF THE DRAWINGS

FIG. 3 is an exemplary chart determined in accordance with the method of the present invention, depicting the relationship between airflow and differential static pressure for a given air handling unit and pressure plate.

FIG. 5 is an exemplary chart employed in accordance with the method of the present invention, depicting various air filters with respect to cost and filter face velocity.

DETAILED DESCRIPTION OF THE INVENTION

While the present invention will be described more fully hereinafter with reference to the accompanying drawings, in which one or more embodiments of the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Pressure Plate

Figure 1:
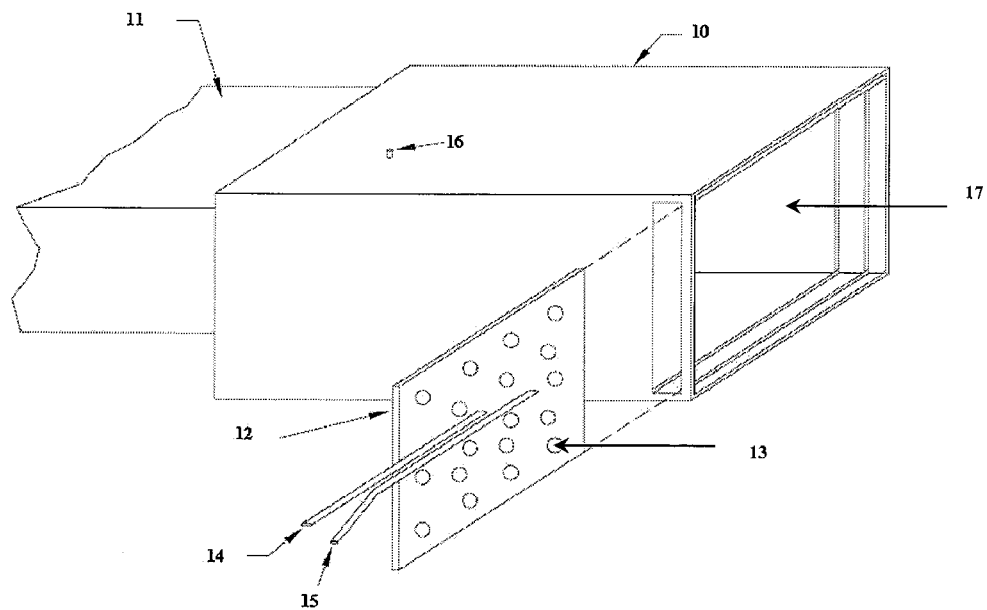
FIG. 1 is side aspect view of one embodiment of the system of the present invention.
Figure 2:
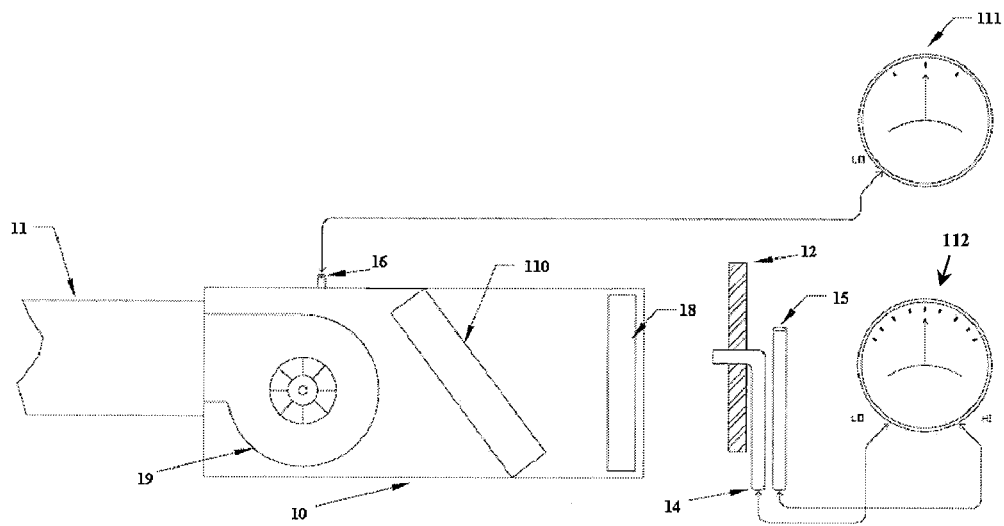
FIG. 2 is side cutaway view of one embodiment of the system of the present invention.

FIG. 1 depicts one embodiment of the system of the present invention. Shown is air handling unit 10, supply duct 11, perforated pressure plate 12 containing a plurality of apertures 13, and flexible leads 14 and 15. Air flows into the system in the direction of arrow 17. With reference to FIG. 2, also shown is filter rack 18, blower 19, and heating element 110. The dimensions of the pressure plate 12 correspond to the dimensions of the particular filter rack 18 of the air handling unit 10. In accordance with the method of the present invention, the combined area of the apertures 13 of the pressure plate 12 is calculated to represent an air pressure loss equal to the known nominal airflow rating, measured in cubic feet per minute (cfm), of the particular air handling unit 10 taking into account a standard low-pressure-loss air filter under slightly used (dirty) conditions. Accordingly, the pressure plate 12 provides a stable surface across which to measure the pressure loss with predictability and repeatability.

In order to determine the optimal airflow for a given air handling unit 10 in the field, an airflow/pressure loss relationship is first calculated under laboratory conditions. Accordingly, each specific air handling unit 10 (or self contained air conditioning unit) model for any given manufacturer may be tested according to the method of the present invention:

The published nominal airflow for the subject air handling unit 10 is reviewed and noted. If the air handling unit 10 has provisions for a mounted air filter, the filter is removed and a pressure plate 12 with a known free area opening is inserted in the filter rack. The pressure plate 12 is designed to equally distribute the air across the face area of the intake of air handling unit 10 in order to create sufficient pressure to provide repeatable differential static pressure readings at varying airflow rates.

The differential static pressure across plate 12 is measured and recorded using a differential pressure manometer 112 using two flexible leads 14 and 15 which are attached to either side of the pressure plate 12 and further to manometer 112. Next, pressure plate 12 is removed and the nominal airflow is measured with a high accuracy flow meter, such as, without limitation, a flow hood or air velocity meter known in the art. Additional differential static pressure measurements are then performed at varying airflow rates which are created either by restricting the airflow at the inlet or outlet of the system and/or varying the blower 19 speed of the air handling unit 10. Accordingly, by plotting the recorded data, an airflow/pressure loss table is generated, as shown by way of example in FIG. 3, for a particular air handling unit 10. This plot depicts the relationship between the static differential pressure and the actual airflow. Additional plots can be generated which take into account air-filters of varying size and filtration capability.

Pressure Plate—Establishing and Monitoring Proper Airflow

In order to establish and monitor proper airflow according to the present invention, one first determines the current airflow of a particular air handling unit 10 in order to assess whether the airflow is sub-optimal, and secondly, determine the cause of the sub-optimal airflow and the location of the blockage (i.e. upstream or downstream). Accordingly, the airflow (without filter) for any specific air handling unit 10 or air handling unit/filter combination can be determined by measuring the differential static pressure across the pressure plate 12 and referring to the corresponding airflow/pressure loss plot (for example, FIG. 3) for that specific air handling unit 10 or air handling unit/filter-grille combination. This procedure allows the technician to accurately determine the airflow with simple low cost devices where the use of laboratory instruments is not practical.

Figure 4:
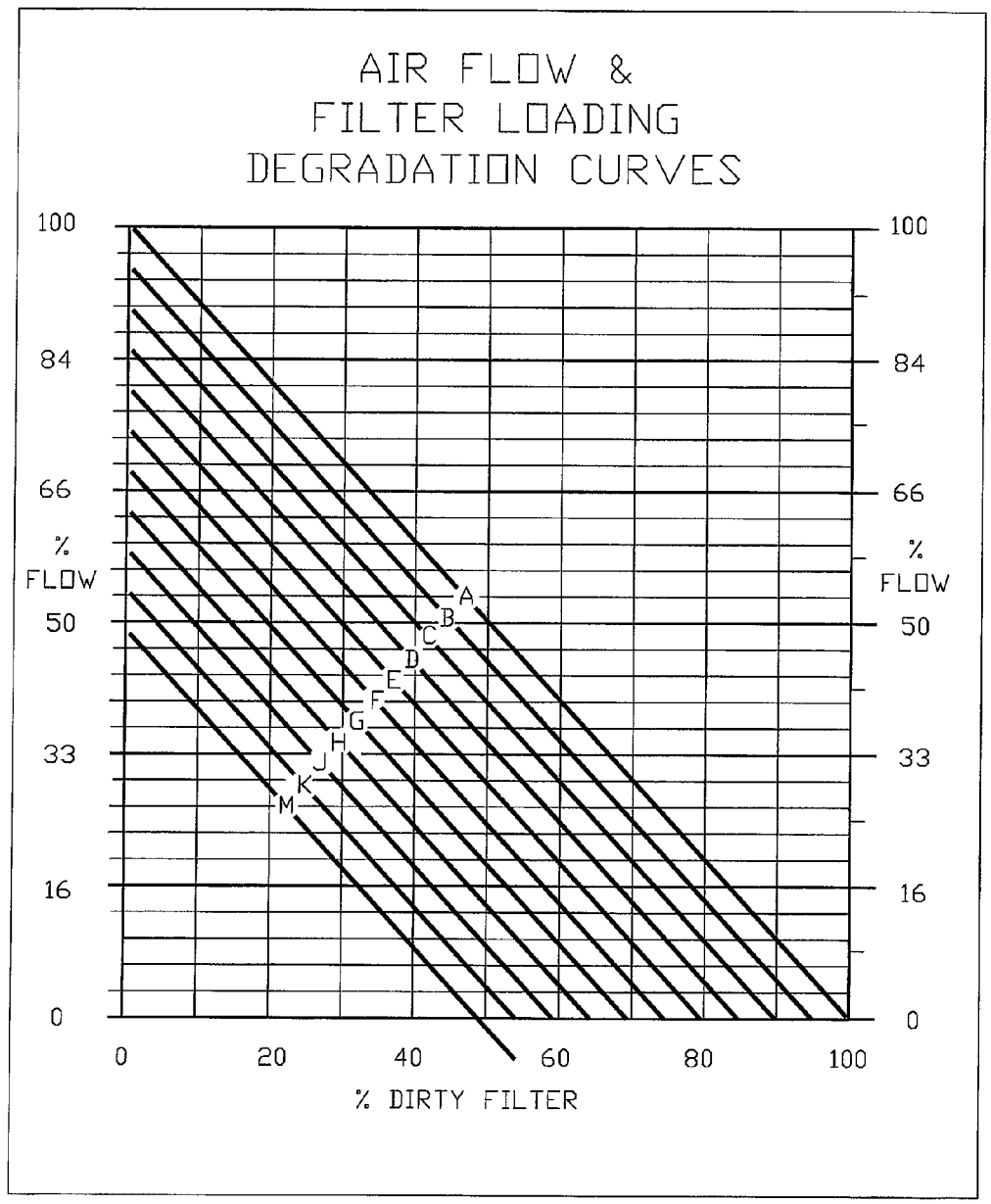
FIG. 4 is an exemplary graph employed in accordance with the method of the present invention, depicting the relationship between the percentage of air flow through a given air filter and the level of obstruction of the given air filter.

Specifically, the airflow is determined by removing the filter from the filter rack and inserting the appropriate pressure plate 12 that corresponds to the particular air handling unit 10. The technician then measures the pressure loss across the plate 12 using a differential pressure manometer 112 and determines the corresponding airflow by using the known airflow/pressure loss plot (for example, FIG. 3) for the air handling unit 10. With reference to FIGS. 4 and 5, the technician can then determine the optimal airflow, taking into account airflow loss due to the type of air filter being used by referring to the airflow/filter degradation relationship, which provides a reference for most standard filter types and filter-rack size combinations.

Once the airflow has been assessed and adjustments and/or corrections have been made to achieve the optimum airflow, the corresponding suction pressure of the blower 19 (shown in FIGS. 1 and 2) may be measured and recorded in real time at point 16. This establishes the reference point of optimum airflow for the system regardless of variations caused by dirty filters, dirty coils, closed registers, and the like. A number of visible or audible devices may be used to monitor airflow and conditions and signal deviation from the reference point. Such devices may be as simple as a visual indicator gage 111 or an audible alarm that may be incorporated into an electronic thermostat. The monitoring data may be used to calculate cost/benefit analysis for system efficiency and filtration effectiveness by using the airflow/filter degradation relationship shown in FIG. 4 and FIG. 5.

Sensor Tubes

Figure 6:
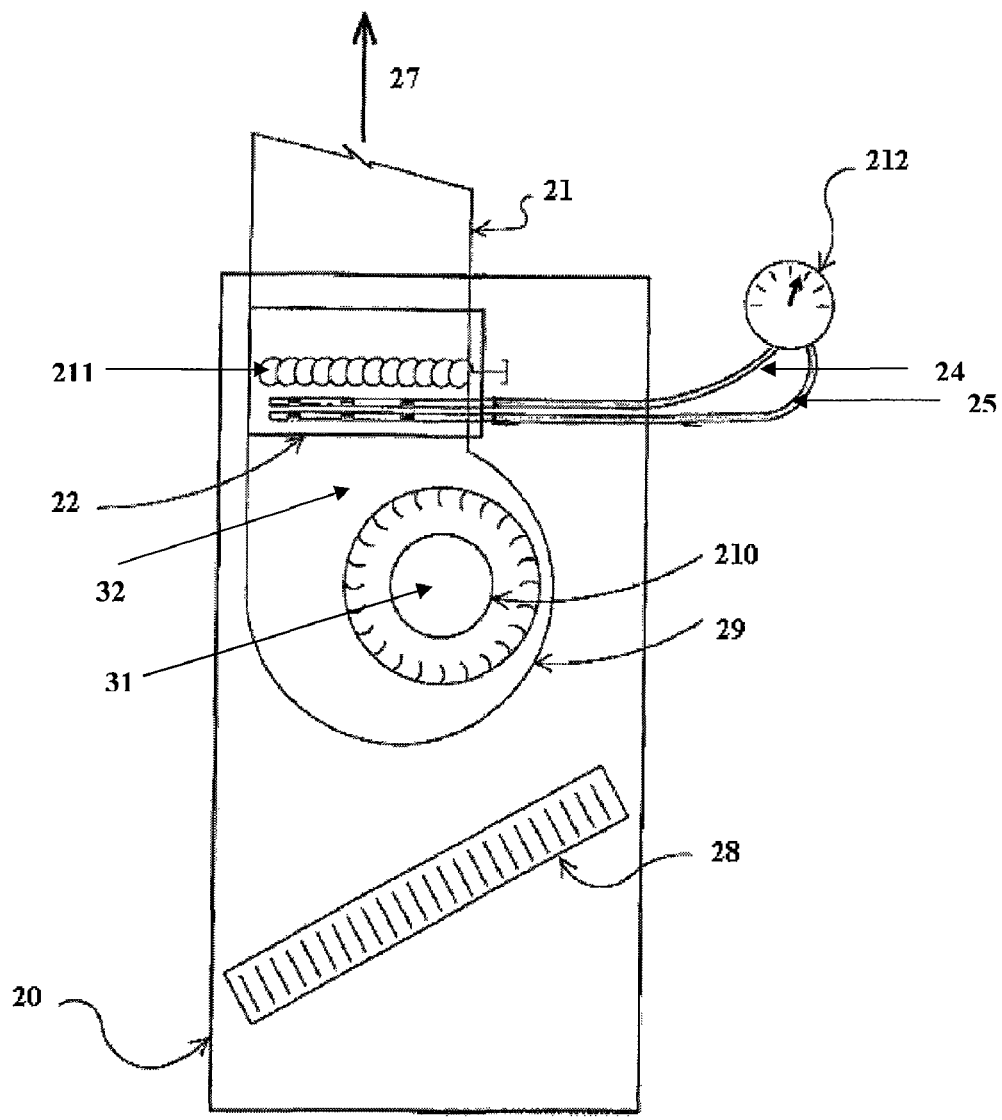
FIG. 6 is side view of another embodiment of the system of the present invention.

FIG. 6 depicts an alternative embodiment of the system of the present invention. Shown is air handling unit 20, supply duct 21 with air flowing in the direction of arrow 27, auxiliary heater assembly 22, air velocity pressure sensor tubes 24 and 25, heating/cooling coil 28, blower 29, motor 210, heating element 211, and differential pressure manometer 212.

Figure 7:
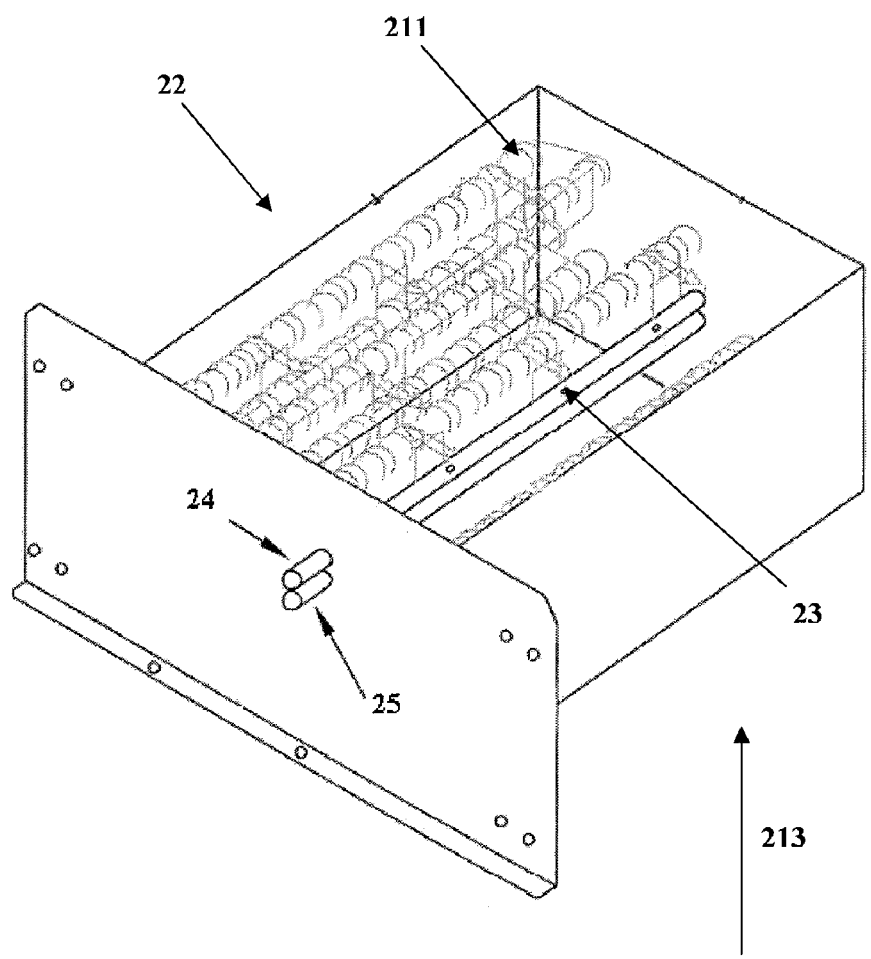
FIG. 7 is an expanded view of another embodiment of the system of the present invention, depicting sensor tubes mounted to an auxiliary heater, wherein the sensor tubes are disposed between the auxiliary heater and a blower (not shown).

With reference to FIG. 7, in one embodiment, the sensor tubes 24 and 25 are mounted directly in the auxiliary heater assembly 22, or on a mounting plate (not shown) disposed within supply duct 21 when the electric heater is not integrated into the air handling unit 20. Each of sensor tubes 24 and 25 contain one or more apertures 23 located substantially toward the distal end of the tubes through which air ejected from the blower 29 is sensed. In some embodiments, sensor tubes 24 and 25 are stacked one upon the other such that the corresponding apertures 23 of the tubes are substantially co-incident.

As shown in FIG. 7, tube 25 is disposed between the blower 19 and tube 24, with both sensor tubes 24 and 25 disposed between the blower 19 and heating element 211, such that tube 25 measures the total pressure and tube 24 measures the static pressure. The two sensor tubes 24 and 25 are attached to manometer 212, at their proximal ends. Air velocity pressure is determined by subtracting the static pressure from the total pressure. Accordingly, with air flowing in the direction of arrow 213, the manometer 212 measures the air velocity pressure by sensing the difference between the total pressure at sensor tube 25 and static pressure at sensor tube 24.

With reference again to FIG. 6, in an alternative embodiment, sensor tubes 24 and 25 may be located at the outlet 32 and inlet 31, respectively, of the blower 29. In this configuration, the manometer 212 measures the pressure differential across the blower 29, which can be used to effectively determine obstructions or problems in the system, i.e. whether it is up-stream or down-stream of the blower. The advantage of this configuration is that there is typically a greater pressure differential across the blower than is typically found within the auxiliary heater assembly or, if omitted, within the supply duct 21.

As with the pressure plate embodiment, in order to determine the optimal airflow for a given air handling unit 20 in the field, an airflow/pressure loss relationship is first calculated under laboratory conditions. Accordingly, each specific air handling unit 20 (or self contained air conditioning unit) model for any given manufacturer may be tested according to the method of the present invention. The published nominal airflow for the subject air handling unit 20 is reviewed and noted. Sensor tubes 24 and 25 with a known free area opening (i.e. combined surface area of one or more apertures 23) are inserted between the auxiliary heater 22 (if used) and blower 19. Alternatively, sensor tubes 24 and 25 may be located at the outlet 32 and inlet 31, respectively, of the blower 29.

The differential static pressure between sensor tube 24 and sensor tube 25 is measured and recorded using the aforementioned manometer 212. Next, sensor tube 24 and sensor tube 25 are removed and the nominal airflow is measured with a high accuracy flow meter. Additional air velocity pressure measurements are then performed at varying airflow rates which are created by restricting the airflow inlet or outlet; and/or varying the fan speed of the blower 19 of the air handling unit 20 (or self contained air conditioning unit). Accordingly, an airflow/air velocity pressure table is generated as shown by way of example in FIG. 3, for a particular air handling unit 20, and auxiliary electric heater (if used) combination. Additional plots can be generated which take into account airflow losses from various air filter models of various manufacturers.

Sensor Tubes—Establishing and Monitoring Proper Airflow

In order to establish and monitor proper airflow in an air conditioning system according to the second embodiment of the method of the present invention, one first determines the actual airflow to assess whether the airflow is sub-optimal, and make adjustments to fan speeds, dampers, duct sizing, etc. to attain optimal airflow. The sensor tube embodiment of the present invention allows the airflow to be measured for any system, regardless of airflow restrictions (air filters, size of ductwork, dampers, etc.) and for each specific air handling unit 20 that is used in the system that has been laboratory tested with the present invention. This allows the technician to use simple low cost devices to quickly and accurately determine airflow if the use of laboratory instruments is not practical.

The technician measures the pressure loss across the sensor tubes 24 and 25 manometer 212 and determines the corresponding airflow by using the known airflow/pressure loss plot (for example, FIG. 3) for the air handling unit 20. With reference to FIGS. 4 and 5, the technician can then determine the optimal airflow, taking into account airflow loss due to the type of air filter being used by referring to the airflow/filter degradation relationship, which provides a reference for most standard filter types and filter-rack size combinations.

In comparison to the pressure plate embodiment described herein, the sensor tube embodiments have additional benefits in that the sensor tube arrangement can be permanently installed for continuous monitoring and adjustment of the airflow. Accordingly, once the airflow has been assessed and adjustments and/or corrections have been made to achieve the optimum airflow, the corresponding pressures may be measured and recorded in real time with the use of manometer 212. If the optimal airflow falls below a given threshold value, a warning can be activated which advises the operator of the AC unit to check the unit for obstructions or to change a dirty filter. In cases where the airflow drop is drastic, a secondary warning can be delivered which instructs the operator to contact a technician to service the unit or an automated shut-down of the AC system may be initiated.

In the foregoing description, the present invention has been described with reference to specific exemplary embodiments thereof. However, it will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense.

I claim:

1. A method for determining the airflow/pressure loss function in an air handling unit, comprising:
   a. placing a pressure plate with a known surface area in the filter rack of said air handling unit whereby said pressure plate is designed to equally distribute the air across the air intake of said air handling unit;
   b. measuring and recording the differential static pressure across said pressure plate using a differential pressure manometer;
   c. removing said pressure plate and measuring the airflow of said air handling unit using a high accuracy flow meter;
   d. varying said airflow of said air condition system;
   e. repeating steps a-d; and
   f. determining the correlation between said differential static pressure across said pressure plate and the actual airflow.

2. The method in claim 1, further comprising varying said airflow of said air handling unit by restricting said airflow at the inlet of said air handling unit.

3. The method in claim 1, further comprising varying said airflow of said air handling unit by restricting said airflow at the outlet of said air handling unit.

4. The method in claim 1, further comprising varying said airflow of said air handling unit by increasing or decreasing the blower fan speed of said air handling unit.

5. A method for determining the airflow/pressure loss function for an air handling unit, comprising:
   a. placing a first end of a first and second sensor tubes in said air handling unit wherein said sensor tubes have one or more apertures of a known free area and wherein a second end of said first sensor tube is attached to a first inlet of a differential pressure manometer and the second end of said second sensor tube is attached to a second inlet of said differential pressure manometer;
   b. measuring and recording the differential static pressure across said first and second sensor tubes using said differential pressure manometer;
   c. removing said sensor tubes from said air handling unit and measuring the airflow of said air handling unit using a high accuracy flow meter;
   d. varying said airflow of said air handling unit;
   e. repeating steps a-d; and f. determining the correlation between, said differential static pressure across said sensor tubes and the actual airflow.

6. The method in claim 5, further comprising varying said airflow of said air handling unit by restricting said airflow at the inlet of said air handling unit.

7. The method in claim 5, further comprising varying said airflow of said air handling unit by restricting said airflow at the outlet of said air handling unit.

8. The method in claim 5, further comprising varying said airflow of said air handling unit by increasing or decreasing the blower fan speed of said air handling unit.

9. The method in claim 5, wherein said first end of said first and second sensor tubes are disposed between a heating elements and a blower of said air handling unit.

10. The method of claim 9, wherein said second sensor tube is disposed between said first sensor tube and said blower.

11. The method of claim 9, wherein said one or more apertures of said first and second sensor tubes are substantially co-incident.

12. The method of claim 5, wherein the first end of said first sensor tube is disposed at the outlet of a blower of said air handling unit, and the first end of said second sensor tube is disposed at the inlet of a blower of said air handling unit.

13. A system for measuring the airflow in an air handling unit, comprising:
- a first sensor tube having a one or more apertures;
- a second sensor tube having one or more apertures;
- a differential pressure manometer;
- wherein a first end of each of said sensor tubes is attached to said differential pressure manometer and a second end of each of said sensor tubes is disposed between a heating element and a blower of said air handling unit;
- wherein said differential pressure manometer measures the differential pressure loss across said sensor tubes.

14. The system of claim 13, wherein said sensor tubes are flexible and resilient.

15. The system of claim 13, wherein said second sensor tube is disposed between said first sensor tube and said blower.

16. The system of claim 15, wherein said one or more apertures of said first and second sensor tubes are substantially co-incident.

17. A system for measuring the airflow in an air handling unit, comprising:
- a first sensor tube having a one or more apertures;
- a second sensor tube having one or more apertures;
- a differential pressure manometer;
- wherein the first ends of each of said sensor tubes is attached to said differential pressure manometer, the second end of said first sensor tube is disposed at the outlet of a blower of said air handling unit, and the second end of said second sensor tube is disposed at the inlet of a blower of said air handling unit;
- wherein said differential pressure manometer measures the differential pressure loss across said sensor tubes.

18. The system of claim 17, wherein said sensor tubes are flexible and resilient.

19. A method for establishing and monitoring proper airflow in an air handling unit comprising
- placing a first end of a first and second sensor tubes in said air handling unit wherein said sensor tubes have one or more apertures of a known free area and wherein a second end of said first sensor tube is attached to a first inlet of a differential pressure manometer and the second end of said second sensor tube is attached to a second inlet of said differential pressure manometer;
- measuring the differential static pressure across said sensor tubes using said differential pressure manometer;
- calculating the present airflow across said sensor tubes by applying a known airflow/pressure loss function to said pressure loss;
- determining the optimal airflow of said air handling unit, taking into account airflow loss due to the type of air filter to be used by applying a known airflow/filter degradation relationship;
- correcting said present airflow in order to establish said proper airflow; and
- monitoring said proper airflow for airflow deviations using a visible or audible indicator.

20. The method of claim 19, wherein said leads are comprised of flexible tubing.

21. The method of claim 19, wherein the first end of said first sensor tube is disposed at the outlet of a blower of said air handling unit, and the first end of said second sensor tube is disposed at the inlet of a blower of said air handling unit.

* * * * *